United States Patent [19]

Nakano et al.

[11] Patent Number: 4,855,215

[45] Date of Patent: Aug. 8, 1989

[54] PHOTOSETTING POLYMER COMPOSITION

[75] Inventors: Tsunetomo Nakano; Toshikazu Hayashi; Toshinori Tsukada, all of Ichihara, Japan

[73] Assignee: Ube Industries, Ltd., Ube, Japan

[21] Appl. No.: 108,787

[22] Filed: Oct. 15, 1987

[30] Foreign Application Priority Data

Oct. 15, 1986 [JP] Japan .................. 61-244944

[51] Int. Cl.$^4$ .................. C08F 2/50; C08F 255/10; C08F 267/04; C08F 271/02
[52] U.S. Cl. .................. 430/283; 522/14; 522/102; 522/149; 525/282; 525/285; 525/327.6; 525/379
[58] Field of Search .................. 522/149; 430/283; 525/285, 282

[56] References Cited

U.S. PATENT DOCUMENTS

| | | | |
|---|---|---|---|
| 3,539,664 | 11/1970 | Kray | 525/183 |
| 3,644,571 | 2/1972 | Anderson | 525/183 |
| 3,972,961 | 8/1976 | Hammer | 525/285 |
| 4,012,255 | 3/1977 | McMullen | 428/461 |
| 4,163,097 | 7/1979 | Baumann | 522/149 |
| 4,448,875 | 5/1984 | Lewis | 430/283 |
| 4,448,876 | 5/1984 | Lorenz | 430/283 |
| 4,481,340 | 11/1984 | Minnema | 430/283 |
| 4,795,692 | 1/1989 | Anderson | 430/283 |

FOREIGN PATENT DOCUMENTS 1406285 9/1975 United Kingdom .

Primary Examiner—John C. Bleutge
Assistant Examiner—Arthur H. Koeckert
Attorney, Agent, or Firm—Frishauf, Holtz, Goodman & Woodward

[57] ABSTRACT

A photosetting polymer composition comprises:
a base polymer comprising a denatured copolymer which is produced by reacting a copolymer of maleic anhydride and an unsaturated hydrocarbon compound with a specific aminocarboxylic acid, an alcohol or a cellosolve derivative, and a glycidyl (meth)acrylate compound under specific conditions;
5–500 weight parts of a photopolymerizable monomer per 100 weight parts of the base polymer; and
1–50 weight parts of a photopolymerization initiator per 100 weight parts of the base polymer.

14 Claims, No Drawings

PHOTOSETTING POLYMER COMPOSITION

BACKGROUND OF THE INVENTION

1. Field of the Invention

This invention relates to a process for preparing a denatured maleic anhydride-type copolymer having a controlled number of photosensitive groups, and to a photosetting polymer composition which comprises a base polymer comprising the denatured copolymer, a photopolymerizable monomer and a photopolymerization initiator.

The photosetting polymer composition is advantageously used in industries relating to circuit-printable boards and circuit-printed boards as a solder resist solder mask), a marking ink, a solder leveler ink, a material for insulation of adjoining layers of a multilayer printed board, etc.

2. Description of Prior Art

As solder resists, thermosetting solder resists such as a resist of melamine resin type and a resist of epoxy resin type have been used. Recently a UV solder resist which is curable by ultra-violet rays has found use in consumer's goods. However, for use in industrial goods, the thermosetting solder resists such as the a resist of epoxy resin type is mainly used.

In addition, various photosetting solder resists with which patternning by photolithography is possible have been proposed.

The need for high density printed circuit boards has recently grown arranged to connect IC lands. Accordingly, the solder resist must reliably cope with the requirement for manufacturing more densely arranged circuit-printed boards.

However, in the case of using the thermosetting solder resist, it is difficult to form a fine pattern because the pattern formation must be formed by a silkscreen printing process and the silk is apt to bend to lower presicion of positioning.

As for the UV solder resists, there is a problem that these show low reliability in curing a thick film, and moreover that resistance to chemicals and solvents is insufficient.

As for the photosetting solder resists, there is a problem that most of them need development using an organic solvent and such development is unfavorable in handling and apparatus.

As fluxes used for the soldering, a water soluble flux is more preferably used than a rosin type flux from the viewpoint of the simplicity of application. However, there is a problem that the known solder resists hardly have enough adhesion to the water soluble flux.

SUMMARY OF THE INVENTION

Accordingly, an object of the present invention is to provide a photosetting composition having satisfactory heat-resistance, mechanical properties and chemical properties, by the use of which formation of a fine pattern can be done, covering with satisfactory positioning accuracy is accomplished, development with an aqueous alkaline solution can be performed, sufficient adhesion to a water soluble flux is attained.

There is provided by the present invention a photosetting composition comprising:

a base polymer comprising a denatured or base copolymer which is produced by reacting a copolymer of maleic anhydride and an unsaturated hydrocarbon compound, with a compound having the formula (I) and a compound having the formula (II):

wherein $R^1$ is an alkylene group having 1-12 carbon atoms or an aromatic group and $R^2$ is a residue of a saturated compound having 1-12 carbon atoms, to open a portion of acid anhydride rings of the maleic anhydride units of the copolymer, heating the resulting copolymer to close a portion of units which have been formed by opening the rings with the compound of the formula (I) to form units having an imido structure, and reacting the resulting copolymer with a compound having the formula (III):

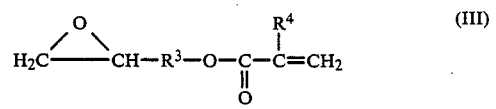

wherein $R^3$ is an alkylene group having 1-12 carbon atoms or an aromatic group and $R^4$ is hydrogen or methyl, to introduce the (meth)acryloyl group of the compound of the formula (III) into a portion of carboxyl groups of the copolymer which have been formed by the ring-opening reaction and a portion of the acid anhydride rings of the copolymer, said denatured copolymer containing residual acid anhydride rings of less than 60 molar % based on the number of the acid anhydride ring of the starting copolymer and having an addition ratio of (metha)acryloyl group originating from the compound of formula (III) in terms of [number of the introduced (meth)acryloyl group/number of the maleic anhydride unit of the starting copolymer] × 100 being not less than 1%;

5-500 weight parts of a photopolymerizable monomer per 100 weight parts of the base polymer;

1-50 weight parts of a photopolymerization initiator per 100 weight parts of the base polymer.

The photosetting polymer composition of the present invention enables the formation of a fine-pattern and the covering with high precision by photolithography. Further, a film of the photosetting polymer composition can be developed easily with an aqueous alkaline solution, and shows adhesion resistant to provision of a water soluble flux thereon. Furthermore, the film shows high thermal resistance and satisfactory mechanical and chemical characteristics. The film is satisfactory in tacking. Accordingly, the photosetting polymer composition of the invention is advantageously used as insulating material of multilayer circuit-printed boards such as a solder resist, a marking ink and a solder leveler ink in circuit-board industries.

Furthermore, the photosetting polymer composition of the invention can be obtained by incorporating another component in the reaction mixture without isolating the above-mentioned polymer after preparation of the base polymer. Therefore, the photosetting polymer composition of the invention is easily prepared.

DETAILED DESCRIPTION OF THE INVENTION (Except as otherwise indicated, percentages are molar-percent.)

The denatured maleic anhydride-type copolymer used as the base polymer in the invention has the above-mentioned specific structure. If the denatured copolymer contains residual acid anhydride rings of more than 60% based on the number of the acid anhydride ring of the starting copolymer (in other words, the ratio of ring opening of acid anhydride rings caused by the compounds having the formulae (I), (II) and (III) is less than 40%), the solubility in an aqueous weak alkaline solution is made poor, so that the developability in the formation of a resist pattern worsens. If the ratio of the residual acid anhydride ring is too low, moisture resistance of the formed resist film is poor. Therefore, the denatured maleic anhydride copolymer preferably contains the residual acid anhydride ring in the range of 10-50%.

Further, in the above-mentioned denatured maleic anhydride copolymer, the ratio of ring opening (opened-ring rate) of the above-mentioned acid anhydride group caused by the compounds having the formulae (I) and (II) preferably is in the range of 1:9 to 8:2. It is preferable that not less 80% of the ring-opened portions caused by the compound having the formula (I) are closed to form imido rings, from the viewpoint of thermal resistance and initial adhesion.

If the ratio of addition of (meth)acryloyl group of the compound having the formula (III) is lower than 1% in the denatured maleic anhydride copolymer, the photosetting property is not enough and accordingly a property of film formation and physical properties of the cured film deteriorate. Furthermore, if the above-mentioned addition ratio is too high, the density of the photosensitive groups becomes too high, whereby thermal copolymerization easily occurs at a pre-baking step, preservation stability becomes poor, and further the developability lowers due to the resulting decrease of the density of the carboxyl groups. Therefore, the denatured maleic anhydride copolymer preferably has the ratio of the addition of (meth)acryloyl group of the compound (III) in the range of 2 to 50%.

Furthermore, in the denatured maleic anhydride copolymer, a proportion between the (meth)acryloyl group of the compound of the formula (III), which is attached to the carboxyl group formed by ring-opening of the acid anhydride ring by the compounds having the formulae (I) and (II), and the (meth)acryloyl group of the compound having the formula (III) that is reacted to the residual acid anhydride ring of the pre-denatured copolymer preferably is in the range of 2:1 to 10:1.

The ratio of the residual acid anhydride ring in the denatured copolymer is calculated, by measuring IR spectra of the starting copolymer and the denatured copolymer. More specifically, the ratio of the residual (that is, unreacted) acid anhydride ring is calculated from change of the amount of peaks at 1770 cm$^{-1}$ and 1850 cm$^{-1}$ (peaks assigned to C=O of acid anhydride ring), referring to a peak at 650 cm$^{-1}$ (peak assigned to the amido group of dimethylformamide).

The ratio of addition of (meth)acryloyl group is calculated, by measuring NMR spectra of the reactant and the reaction product. In more detail, the addition ratio is calculated from change of number of proton of doublebond of the hydroxyalkylene (meth)acrylate using a calibration curve which is prepared using as an internal reference octamethylcyclotetrasiloxane (OMCT).

Examples of the unsaturated hydrocarbons to be copolymerized with maleic anhydride to form a copolymer which is the starting compound for the preparation of the above-mentioned denatured maleic anhydride copolymer include isobutylene, styrene, α-methylstyrene and p-vinylphenol. Particularly preferred is isobutylene.

Examples of aminocarboxylic acid, namely, the compounds having the formula (I), include glycine, β-alanine, and o-, m- and p-aminobenzoic acids.

Examples of the compounds having the formula (II) include alcohols such as methanol and ethanol, and cellosolve derivatives such as ethylcellosolve and butylcellosolve. The cellosolve derivatives are particularly preferred.

Examples of the compounds having the formula (III) include glycidyl (meth)acrylate and glycidylpropyl (meth)acrylate.

Accordingly, the denatured maleic anhydride-type copolymer employable in the invention can be prepared by the following process.

A maleic anhydride copolymer composed of a repeating unit having the formula (IV):

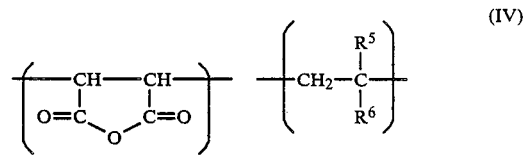

(IV)

wherein each of R$^5$ and R$^6$ independently is hydrogen, an alkyl group having 1-3 carbon atoms or an aromatic group, is reacted with compounds having the aforementioned formulae (I) and (II) to open the acid anhydride ring under the condition that the ratio of ring opening (ratio of opened ring) is made to exceed 40%, and a proportion between a constitutional unit having the formula (V):

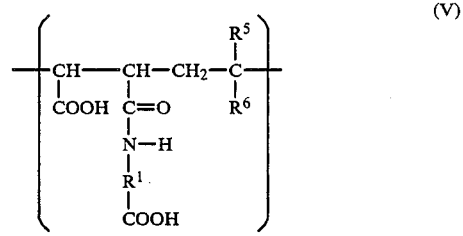

(V)

wherein R$^1$, R$^5$ and R$^6$ having the same meanings as above, (corresponding to a constitutional unit which is formed by opening the acid anhydride ring with a compound of the formula (I)) and a constitutional unit having the formula (VI):

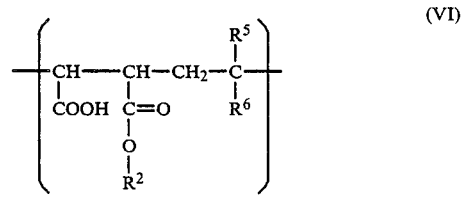

(VI)

wherein $R^2$, $R^5$ and $R^6$ having the same meanings as above, (corresponding to a constitutional unit which is formed by opening the acid anhydride ring with a compound of the formula (II)) preferably is in the range of 1:9 to 8:2, and more preferably in the range of 2:8 to 7:3.

Preferably at least 80%, more preferably at least 90% of the constitutional units of the formula (V) are converted into a closed imido ring having the formula (VII):

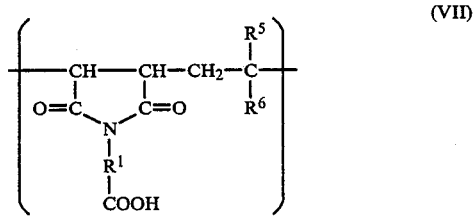

(VII)

wherein $R^1$, $R^5$ and $R^6$ having the same meanings as above.

Finally, to a portion of the carboxyl groups of the units of the formulae (VI) and (VII) as well as to a portion of the acid anhydride rings of the copolymer is attached at least 1%, preferably 2–50% of (meth)acryloyl group of the compound of the formula (III).

The denatured maleic anhydride copolymer employed in the composition of the invention preferably comprises a constituent unit of maleic anhydride including the constituent unit whose acid anhydride ring is opened by the compounds of the formulae (I), (II) and (III), and the constitutional unit of the unsaturated hydrocarbon within a ratio of about 1:1 to 1:10 and preferably has a number average molecular weight (Mn) in the range of about $1.0 \times 10^4$ to $2.0 \times 10^6$.

The denatured maleic anhydride copolymer employable in the composition of the invention is, for example, can be obtained by the following process.

The maleic anhydride copolymer and compounds having the formulae (I) and (II) are reacted with each other in an organic solvent preferably at 70°–140° C., more preferably at 80°–100° C. for about 2–6 hours, and then after addition of an azeotropic solvent such as toluene or xylene, the reaction mixture is heated preferably at 80°–200° C., more preferably at 100°–150° C. for about 3 to 20 hours for performing a cyclizing-dehydrating reaction for the formation of an imido ring. By the reaction, the portion of rings opened by the compound of the formula (I) are converted into imido rings. The reaction product is heated in the presence of a compound of the formula (III) in an organic solvent preferably at 70°–140° C., more preferably at 80°–100° C. for about 2 to 5 hours to obtain the denatured copolymer.

Examples of the photopolymerizable monomers, which is one component of the photosetting polymer composition of the invention, include 2-hydroxyethyl (meth)acrylate, 2-hydroxypropyl (meth)acrylate, ethylene glycol di(meth)acrylate, propylene glycol di(meth)acrylate, trimethylolpropane tri(meth)acrylate, tetramethylolmethane tetra(meth)acrylate, N,N'-methylene bis(meth)acrylamide, diethylaminoethyl (meth)acrylate, 1,3,5-triacryloylhexahydro-s-triazine, and tris(-hydroxyethylacryloyl)isocyanurate.

In the photosetting polymer composition according to the invention, the photopolymerizable monomer is added in an amount of 5–500 weight parts, preferably 30–300 weight parts per 100 weight parts of the above-mentioned base polymer. In the case that the content of the monomer is less than 5 weight parts, the photo-sensitivity lowers and the cross-linking density decreases, whereby the developability, property of film formation and physical properties of the film (particularly, heat resistance and surface hardness) deteriorate. In the case that the content of the monomer is more than 500 weight parts, the cross-linking density extremely increases so that a formed film easily separates in a melted solder bath due to thermal shrinkage.

Examples of the photopolymerization initiators include Micheler's ketone, benzoin, bezoin methyl ether, benzoin ethyl ether, benzoin isopropyl ether, 2-t-butylanthraquinone, 1,2-benzo-9,10-anthraquinone, 4,4'-bis(diethylamino)benzophenone, acetophenone, benzophenone, thioxanthone, diethylthioxanthone, 1,5-acenaphthene, ethyl p-dimethylaminobenzoate and benzil.

The photopolymerization initiator is incorporated in the photosetting polymer composition of the invention in an amount of 1–50 weight parts, preferably 5–40 weight parts per 100 weight parts of the base polymer. In the case that the amount is less than 1 weight part, sufficient cross-linking is not attained by irradiation, and the photo-sensitivity lowers. In the case that the amount exceeds 50 weight parts, the photopolymerization initiator likely remains in the cured film to adversely effect the film property, while the photo-sensitivity does not rise any more.

The photosetting polymer composition of the invention is soluble in organic solvents. When it is used as a solder resist, etc., the composition is used as a solution containing in an organic solvent the denatured copolymer, monomer and initiator in an amount of 30–90 weight %, preferably 50–90 weight %, namely, a photosetting polymer solution. There is no specific limitation with respect to the organic solvent. Examples of the organic solvents include alcohols such as methyl alcohol, ethyl alcohol, butyl alcohol, n-propyl alcohol and isopropyl alcohol and cellosolve solvents such as ethylcellosolve and butylcellosolve.

The photosetting polymer solution preferably has a rotation viscosity in the range of about 0.1 to 1,000 poise, more preferably 1–500 poise at the ordinary temperature.

The photosetting polymer solution preferably contains an inorganic filler. The addition of the inorganic filler reduces the coefficient of linear expansion so that shrinkage by curing decreases, increases adhesion to a melted solder and the surface hardness, and further gives favorable influence upon printing characteristics. Examples of the inorganic fillers include mica, clay, talc, alumina white, diatomaceous earth, bentonite, wallastonite, quartz ($SiO_2$), aluminum hydroxide, calcium sulfate, barium sulfate, magnesium silicate, titanium dioxide, zinc oxide, silica alumina, and silicon nitride.

The inorganic filler is preferably incorporated in an amount of 0–160 weight parts, more preferably 40–150 weight parts per 100 weight parts of the base polymer.

The photosetting polymer solution may contain a thermal polymerization inhibitor, if desired. Examples of the thermal polymerization inhibitors include hydroquinone, methylether hydroquinone, 2,6-di-t-butyl-4-methylphenol (BHT), benzoate, benzoquinone and 4-hydroxymethyl-2,6-di-t-butylphenol.

The thermal polymerization inhibitor is preferably contained in an amount of 0.01–5 weight parts, more preferably 0.05-1 weight part per 100 weight parts of the base polymer.

The photosetting polymer solution may contain, if desired, a dye or pigment such as phthalocyanine blue, phthalocyanine green, cyanine green, titanium white, titanium yellow, carbon black, chrome yellow, Hansa Yellow, Lake Red, methyl violet, brilliant green, and victoria blue, a thixotropy-increasing agent such as aerogil (available from Nippon Aerogil Co., Ltd.), an antifoaming agent such as dialkylpolysiloxane, both of which are effective to increase printability, and a fire-retardant such as diantimony pentoxide.

The photosetting polymer composition can be employed in the form of the photosetting solution to form an insulative overcoat film, in the following manner.

The photosetting polymer solution is coated on a substrate, and then is dried to evaporate the organic solvent. The coating on the substrate, for example, can be done by curtain coating, roll coating, silk screen coating, dip coating, docter knife coating, etc. The coated film can be dried using hot air, far infrared rays, etc., preferably at a temperature of lower than 100° C., more preferably at a temperature of lower than 80° C. The drying procedure can be performed under normal or reduced pressure.

After the coated film is dried, a negative film is placed on the coated film, and is irradiated with rays emitted from, for example, a high pressure mercury lamp, a ultra-high pressure mercury lamp, a xenon lamp, a metal halide lamp, etc.

80-120 W/cm at a rate of 1-4 m/min, whereby an insulative overcoat film is produced.

The following examples describe the process for the production of the denatured maleic anhydride copolymer of the invention and the photosetting polymer composition of the invention.

Production Examples 1-3 & Comparison Production Examples 1-3

Isoban-04 (available from kuraray Isoprene Chemical Co., Ltd., copolymer of maleic anhydride and isobutylene, namely, maleic anhydride copolymer), p-aminobenzoic acid (compound of the formula (I)), butyl cellosolve (compound of the formula (II)) were reacted with each other in butyl cellosolve, and then after addition of toluene (azeotropic solvent), the reaction mixture was heated for performing a cyclizing-dehydrating reaction for the formation of imido ring (by this reaction, a portion of rings opened with p-aminobenzoic acid were converted into imido rings. The reaction product was then heated with glycidyl methacrylate (compound of the formula (III)) under the reaction conditions indicated in Table 1 to obtain a denatured copolymer. The ratio of the acid anhydride ring remaining in the denatured copolymer (residual ring ratio, determined from variation of peak strength of IR spectrum according to the method described hereinbefore), the ratio of addition of the methacryloyl group, and a ratio of imido group closed with the compound of the formula (I) (imidation ratio) are set forth in Table 1.

TABLE 1

|  | Production Example | | | Production Example For Comparison | | |
|---|---|---|---|---|---|---|
|  | 1 | 2 | 3 | 1 | 2 | 3 |
| Reactants |  |  |  |  |  |  |
| Isoban-04 | 20.0 | 20.0 | 20.0 | 20.0 | 20.0 | 20.0 |
| p-Aminobenzoic Acid | 8.9 | 3.6 | 14.2 | 17.8 | 8.9 | — |
| Butylcellosolve | 47.7 | 52.3 | 43.1 | — | 52.3 | 55.3 |
| Molar Ratio | 0.5 | 0.2 | 0.8 | 1.0 | 0.5 | 0 |
| Glycidyl Methacrylate | 4.6 | 4.6 | 4.6 | 4.6 | 4.6 | 4.6 |
| Reaction Conditions |  |  |  |  |  |  |
| Acid Anhydride Ring Opening | 100° C. 3 hrs | 100° C. 3 hrs | 100° C. 3 hrs | 100° C. 3 hrs | 100° C. 4 hrs | 100° C. 4 hrs |
| Imido Ring Closure | 140° C. 3 hrs | 140° C. 3 hrs | 140° C. 3 hrs | 140° C. 3 hrs | 140° C. 3 hrs | 140° C. 3 hrs |
| Addition of Acrylate | 80° C. 3 hrs | 80° C. 3 hrs | 80° C. 3 hrs | 80° C. 3 hrs | 80° C. 3 hrs | 80° C. 3 hrs |
| Residual Ring Ratio (%) | 27 | 32 | 25 | 23 | 42 | 37 |
| Methacryloyl Addition Ratio (%) | 7.0 | 6.7 | 7.1 | 3.8 | 7.5 | 11.0 |
| Imidation Ratio (%) | Almost all imidated | | | | 32 | 0 |

The irradiated film is then developed by spraying a developing solvent or by dipping the film into a developing solution, and the unexposed part is washed off. As the developed solution, an aqueous alkaline solution such as aqueous sodium carbonate solution having a concentration of 1-5% may be used. The organic solvent listed for the preparation of the aforementioned photosetting polymer solution can be employed as the developing solution.

Subsequently, heat treatment is performed, for example, for 30-60 minutes at 100°-150° C. using hot air or far infrared rays, or using irradiation with rays by means of three ultra-high pressure mercury lamps having Remarks: In Comparison Example 1, 40.0 g of dimethylformamide (DMF) was used as the reaction solvent.

"Molar ratio" means a molar ratio of p-aminobenzoic acid to the maleic anhydride unit of the copolymer before it was denatured.

"Almost all imidated" means that there was not observed in IR spectrum of the reaction product a peak assigned to an amido group formed by the attachment of p-aminobenzoic acid.

Examples 1-3 & Comparison Examples 1-3

Photosetting polymer solutions having the undermentioned composition were prepared using the denatured maleic anhydride copolymers obtained in the abovementioned Production Examples 1-3 and Comparison Production Examples 1-3, for Examples 1-3 and Comparison Examples 1-3, respectively. A photoset film of the polymer composition having a thickness indicated in Table 2 was then formed in the undermentioned manner using the obtained solution.

The obtained film was evaluated with respect to its luster, developability and other physical properties. The results are set forth in Table 2.

Composition

Denatured maleic anhydride copolymer: 100 weight parts
Butyl cellosolve: 200 weight parts Photopolymerizable monomers
Cresol novojak type epoxyacrylate: 70 weight parts
Dipentaerithritol hexaacrylate: 20 weight parts
Trimethyrolpropane triacrylate: 100 weight parts
Hydroxyethyl methacrylate: 20 weight parts
  Photopolymerization initiators
Diethylthioxanthone: 10 weight parts
Ethyl p-dimethylaminobenzoate: 10 weight parts
Benzil: 10 weight parts
Inorganic filler (quartz): 90 weight parts
Thickener (aerogil #200): 10 weight parts
Antifoaming agent (Antifoam): 10 weight parts
Pigment (phthalocyanine green): 7 weight parts
Thermalpolymerization inhibitor: 1 weight part (Hydroquinone)

Preparation of photoset film

1. Coating:
The photosetting polymer solution is coated on a laminated plate of epoxidized glass-copper by screen printing.
2. Drying (pre-baking):
The coated plate is dried in an oven at 80° C. for 15 min. to remove the solvent.
3. Exposure:
Exposure is performed at 500 mJ/cm² using a 2 KW ultra-high pressure mercury lamp (available from Oak Manufacturing Co., Ltd.
4. Development:
The exposed plate is developed using aqueous 1% $Na_2CO_3$ solution by a dipping process or a spraying process (2 Kg/cm²). After the development is complete, the plate is washed.
5. Postcure:
The plate is heated in an oven at 150° C. for 30 min., or the plate is irradiated by means of three 80 W/cm ultra-high pressure lamps at rate of 2 m/min.

Evaluation Procedures (1) Photosensitivity:
On the overcoat film having been subjected to pre-baking is placed a Kodak step tablet (gray scale) and thus combined plate is exposed at 1.5 J/cm². A Quantity of radiation required for completely curing the film is calculated from the condition of the residual photoset film after the development. Thus obtained quantity of radiation is referred to as sensitivity.
(2) Resolution:
Proper exposure is performed using a resolution test pattern and the resolution is obtained from the pattern after development.
(3) Pencil Hardness:
Pencil Hardness is determined according to JIS (Japanese Industrial Standard)-D-0202 8–10.
(4) Adhesion:
Cross-out adhesion test is done according to JIS-D-0202 8–12.
(5) Heat Resistance to Solder:
Cross-cut adhesion test is done according to JIS-D-0202 8–12 after having dipped the plate in a melted solder bath (260° C.). A rosin type flux and a water soluble flux (Cl amount: 2.2%) are used.
(6) Moisture Resistance:
The plate is boiled for 2 hours and a cross-cut adhesion test is done according to JIS-D-0202 8–12.

TABLE 2

|  | Example | | | Comparison Example | | |
|---|---|---|---|---|---|---|
|  | 1 | 2 | 3 | 1 | 2 | 3 |
| Film Thickness (μm) | 10 | 10 | 10 | 10 | 10 | 10 |
| Luster | AA | AA | AA | CC | AA | AA |
| Developability | AA | AA | BB | BB | AA | CC |
| Photosensitivity (mJ/cm²) | | less than 500 | | | | |
| Resolution | | less than 75 | | | | |
| Pencil Hardness | 4H | 4H | 4H | 4H | 4H | 4H |
| Adhesion | AA | AA | AA | AA | AA | BB |
| Moisture Resistance | AA | AA | AA | AA | AA | CC |
| Heat Resistance to Solder | | | | | | |
| (1) Rosin type | | | | | | |
| I | AA | AA | AA | AA | AA | AA |
| II | AA | AA | AA | AA | AA | AA |
| III | AA | AA | AA | AA | AA | AA |
| IV | AA | AA | AA | AA | AA | AA |
| V | AA | AA | AA | AA | AA | AA |
| (1) Water soluble type | | | | | | |
| VI | AA | AA | AA | AA | AA | AA |
| VII | AA | AA | AA | AA | AA | CC |
| VIII | AA | AA | AA | AA | BB | CC |
| IX | AA | AA | AA | AA | CC | CC |

Remarks: AA—satisfactoy, BB—acceptable, CC—unsatisfactory

I: dip once for 10 sec., II: dip twice for 10 sec., III: dip 3 times for 10 sec., IV: dip 4 times for 10 sec., V: dip 5 times for 10 sec., VI: dip once for 10 sec., VII: dip twice for 10 sec., VIII: dip 3 times for 10 sec., IX: dip 4 times for 10 sec.

We claim:
1. A photosetting composition comprising:
a base polymer comprising a base copolymer which is produced by reacting a starting copolymer of maleic anhydride and an unsaturated hydrocarbon compound, with a compound having the formula (I) and a compound having the formula (II):

wherein $R^1$ is an alkylene group having 1–12 carbon atoms or an aromatic group and $R^2$ is a residue of a saturated compound having 1–12 carbon atoms, to open a portion of acid anhydride rings of the maleic anhydride units of the starting copolymer, heating the resulting copolymer to close a portion of units which have been formed by opening the rings with the compound of the formula (I) to form units having an imido structure, and reacting the resulting copolymer with a compound having the formula (III):

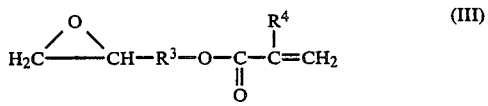

wherein $R^3$ is an alkylene group having 1–12 carbon atoms or an aromatic group and $R^4$ is hydrogen or methyl, to introduce the acryloyl or methacryloyl group of the compound of the formula (III) into a portion of carboxyl groups of the copolymer which have been formed by the ring-opening reaction and a portion of the acid anhydride rings of the copolymer, said base copolymer containing residual acid anhydride rings of less than 60 molar % based on the number of the acid anhydride rings of the starting copolymer and having an addition ratio of acryloyl or methacryloyl group originating from the compound of formula (III) in terms of $$\frac{\text{number of the introduced acryloyl or methacryloyl group}}{\text{number of the maleic anhydride unit of the starting copolymer}} \times 100$$

being not less than 1 molar %;
5–500 weight parts of a photopolymerizable monomer per 100 weight parts of the base copolymer;
1–50 weight parts of a photopolymerization initiator per 100 weight parts of the base polymer.

2. The photosetting polymer composition claimed in claim 1, wherein said base copolymer contains residual acid anhydride rings in the range of 10 to 50 molar % based on the number of the acid anhydride ring of the starting copolymer.

3. The photosetting polymer composition claimed in claim 1, wherein essentially all of said units which have been formed by opening the rings with the compound of the formula (I) are converted into the units having an imido structure.

4. The photosetting polymer composition claimed in claim 1, wherein the said of addition of acryloyl or methacryloyl group of the compound of the formula (III) is in the range of 2 to 50%.

5. The photosetting polymer composition claimed in claim 1, wherein the compound of the formula (II) is 2-ethoxyethanol or 2-butoxyethanol.

6. A process for the preparation of a base copolymer for a photosetting composition which comprises the steps:
reacting a starting copolymer of maleic anhydride and an unsaturated hydrocarbon compound, with a compound having the formula (1) and a compound having the formula (II):

$$\underset{\text{(I)}}{H_2N-R^1-\overset{O}{\overset{\|}{C}}-OH}$$

$$HO-R^2 \quad (II)$$

wherein $R^1$ is an alkylene group having 1–12 carbon atoms or an aromatic group and $R^2$ is a residue of a saturated compound having 1–12 carbon atoms, to open a portion of acid anhydride rings of the maleic anhydride units of the starting copolymer;
heating the resulting copolymer to close a portion of units which have been formed by opening the rings with the compound of the formula (I) to form units having an imido structure; and
reacting the resulting copolymer with a compound having the formula (III):

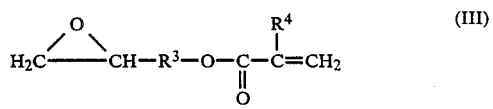

wherein $R^3$ is an alkylene group having 1–12 carbon atoms or an aromatic group and $R^4$ is hydrogen or methyl, to introduce the acryloyl or methacryloyl group of the compound of the formula (III) into a portion of carboxyl groups of the starting copolymer which have been formed by the ring-opening reaction of a portion of the acid anhydride rings of the copolymer to form the base copolymer containing residual acid anhydride rings of less than 60 molar-% based on the number of the acid anhydride ring of the starting copolymer and having an addition ratio of acryloyl or methacryloyl group originating from the compound of formula (III) in terms of $$\frac{\text{number of the introduced acryloyl or methacryloyl group}}{\text{number of the maleic anhydride unit of the starting copolymer}} \times 100$$

being not less than 1 molar-%.

7. The process for the preparation of the base copolymer as claimed in claim 6, wherein the reaction of the base copolymer with the compounds of the formulae (I) and (II) is performed using as a solvent an excessive amount of the compound of the formula (II).

8. The process for the preparation of the base copolymer as claimed in claim 6, wherein the compound of the formula (II) is 2-ethoxyethanol or 2-butoxyethanol.

9. The photosetting polymer composition claimed in claim 1, wherein the unsaturated hydrocarbon compound is isobutylene, styrene, alpha-methylstyrene, p-vinylphenol.

10. The photosetting polymer composition claimed in claim 9, wherein said unsaturated hydrocarbon is isobutylene.

11. The photosetting polymer composition claimed in claim 9, wherein the compound of formula (I) is glycine, beta-alanine, or o-, m- and p-aminobenzoic acids; the compound of formula (II) is methanol, ethanol, 2-ethoxyethanol or 2-butoxyethanol and the compound of formula (III) is glycidyl methacrylate, glycidyl acrylate, glycidylpropyl methacrylate or glycidylpropyl acrylate.

12. The photosetting polymer composition claimed in claim 11, wherein the photopolymerizable monomer is 2-hydroxyethyl acrylate, 2-hydroxyethyl methacrylate, 2-hydroxypropylacrylate, 2-hydroxypropyl methacrylate, ethylene glycol dimethacrylate, ethyleneglycol diacrylate, propylene glycol dimethacrylate, propyleneglycol diacrylate, trimethylolpropane triacrylate, trimethylolpropane trimethacrylate, tetamethylolmethane tetraacrylate, tetramethylolmethane methacrylate, N,N'-methylene bismethacrylamide, N,N-methylene bisacrylamide, diethyaminoethylacrylate, diethylaminoethyl methacrylate, 1,3,5-triacryloylhexa-hydro-s-triazine, or tris(hydroxyethylacryloyl)isocyanurate.

13. The photosetting polymer composition claimed in claim 1, wherein the compound of formula (I) is glycine, beta-alanine, or o-, m- and p-aminobenzoic acids; the compound of formula (II) is methanol, ethanol, 2-ethoxyethanol or 2-butoxyethanol and the compound of formula (III) is glycidyl methacrylate, glycidyl acrylate, glycidylpropyl methacrylate or glycidylpropyl acrylate.

14. The photosetting polymer composition claimed in claim 13, wherein the photopolymerizable monomer is 2-hydroxyethyl acrylate, 2-hydroxyethyl methacrylate, 2-hydroxypropylacrylate, 2-hydroxypropyl methacrylate, ethylene glycol dimethacrylate, ethyleneglycol diacrylate, propylene glycol dimethacrylate, propyleneglycoldiacrylate, trimethylolpropane triacrylate, trimethylolpropane trimethacrylate, tetramethylolmethane tretraacrylate, tetramethylomethane methacrylate, N,N'-methylene bismethacrylamide, N,N'-methylene bisacrylamide diethyaminoethylacrylate, diethylaminoethyl methacrylate, 1,3,5-triacryloylhexa-hydro-s-triazine, or tris(hydroxyethylacryloyl) isocyanurate.

* * * * *